(12) United States Patent
Zhang et al.

(10) Patent No.: US 8,380,024 B1
(45) Date of Patent: Feb. 19, 2013

(54) INTEGRATED ELECTRO-OPTICAL FLUID ROTARY JOINT

(75) Inventors: Hong Zhang, Pennington, NJ (US);
Boying B Zhang, Pennington, NJ (US);
Louis D. Violante, Pennington, NJ (US)

(73) Assignee: Princetel Inc., Hamilton, NJ (US)

( * ) Notice: Subject to any disclaimer, the term of this patent is extended or adjusted under 35 U.S.C. 154(b) by 84 days.

(21) Appl. No.: 13/211,430

(22) Filed: Aug. 17, 2011

(51) Int. Cl.
*G02B 6/26* (2006.01)
(52) U.S. Cl. ................ 385/26; 385/25; 385/31
(58) Field of Classification Search .......... 385/25–27, 385/31; 250/492.1; 175/16
See application file for complete search history.

(56) References Cited

U.S. PATENT DOCUMENTS

| | | | | |
|---|---|---|---|---|
| 5,373,925 A | * | 12/1994 | Handford et al. | 191/12.2 A |
| 7,507,144 B2 | * | 3/2009 | Hirokawa et al. | 451/6 |
| 2010/0326667 A1 | * | 12/2010 | Coppens | 166/355 |
| 2011/0019948 A1 | * | 1/2011 | Hori et al. | 384/114 |
| 2011/0164846 A1 | * | 7/2011 | Zhang et al. | 385/26 |
| 2012/0267168 A1 | * | 10/2012 | Grubb et al. | 175/16 |

* cited by examiner

*Primary Examiner* — Ellen Kim

(57) ABSTRACT

An integrated electro-optical fluid rotary joint has been invented in which optical signals, electrical power, and/or signal(s), as well as fluids can be simultaneously transmitted across a common rotary-stationary interface between two relatively rotatable members for such applications, as a tethered aerostats, and tethered ROV. It consists of a main stator, a main rotor rotatable relative to said main stator. An electrical rotary joint, or slip ring, a fiber optical rotary joint, and a fluid rotary joint are integrated together on the main stator and main rotor. As a result, when the main rotor rotates relative to the main stator, optical signals, electrical power, and/or signal (s), as well as fluids from the main rotor can be transmitted to the main stator, and vise versa.

12 Claims, 2 Drawing Sheets

INTEGRATED ELECTRO-OPTICAL FLUID ROTARY JOINT

BACKGROUND OF THE INVENTION

The present invention relates generally to rotary joints involving electrical, optical and fluid aspects, and more particularly to apparatus for transferring optical signals, electrical power, and/or signal(s), as well as fluids across a common rotary-stationary interface between two relatively rotatable members.

It is well known that the devices to transmit optical data between two independently rotational members are called fiber optical rotary joints. There are single channel, two channel and multi-channel fiber optical rotary joints. A typical fiber optical rotary joint consists of a fixed fiber collimator holder and a rotatable fiber collimator holder which are relatively rotatable each other to allow uninterrupted transmission of optical signals through the rotational interface from fiber collimators on any one of the holders to the fiber collimators on another holder.

Electrical rotary joints, or electrical slip rings are electromechanical devices that consist of rotational and stationary members. They allow the transmission of electrical signals and power from their rotors to stators or vise verse. A conventional electrical slip ring consists of conductive rings mounted on a rotational member, insulated from it, and commuters fixed with a stationary member. Fixed brushes from commuters run in contact with the rings, rubbing against the peripheral surfaces of the rings, transferring electrical power or signals between rotational member and stationary member.

A fluid rotary joint is a mechanism used to transfer liquids and/or gases between rotational and stationary members.

A fiber optic rotary joint in conjunction with an electrical slip ring, a hybrid rotary joint, is a powerful combination in modern mobile and rotational apparatus. In some applications, like tethered aerostats, and tethered ROV, a compound rotary joint to combine 3 media is needed for transferring optical signals, electrical power, and/or signal(s), as well as fluids across a common rotary-stationary interface between two relatively rotatable members.

However, on commercial market, such a compound rotary joint to combine 3 media is not available yet.

SUMMARY OF THE INVENTION

The object of the present invention is to provide a compound rotary joint to combine 3 media for transferring optical signals, electrical power, and/or signal(s), as well as fluids across a common rotary-stationary interface between two relatively rotatable members through an integrated design.

DETAIL DESCRIPTION OF THE INVENTION

Figure 1:
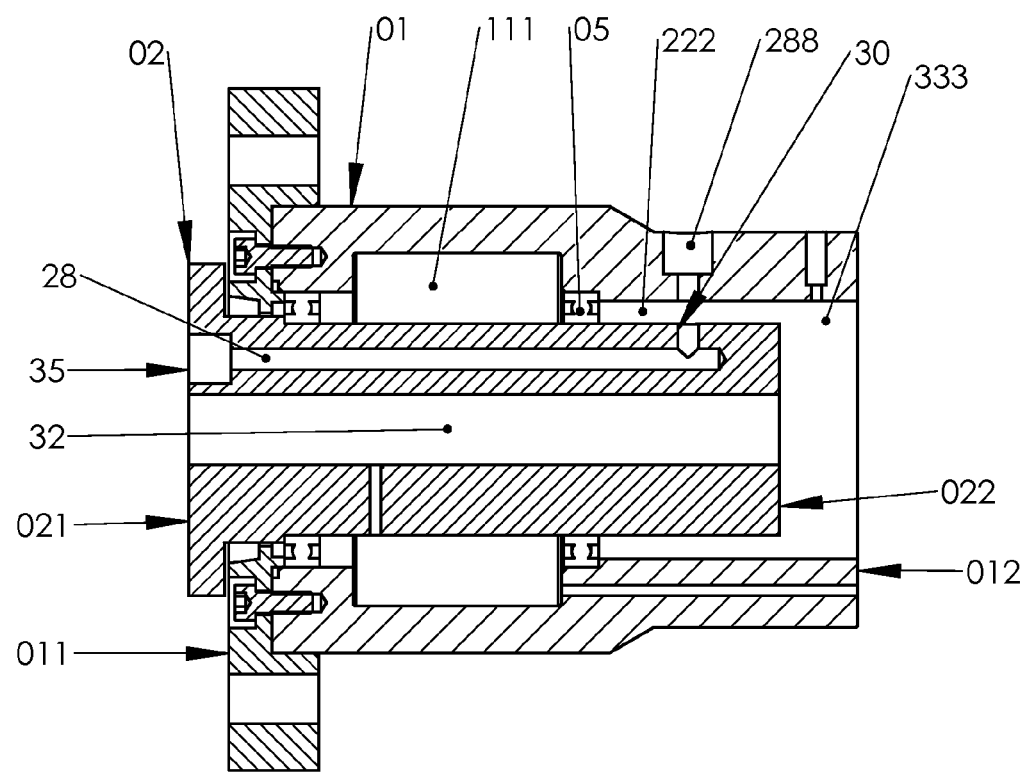
FIG. 1. shows the configuration of the main stator and main rotor in the present invention.
Figure 2:
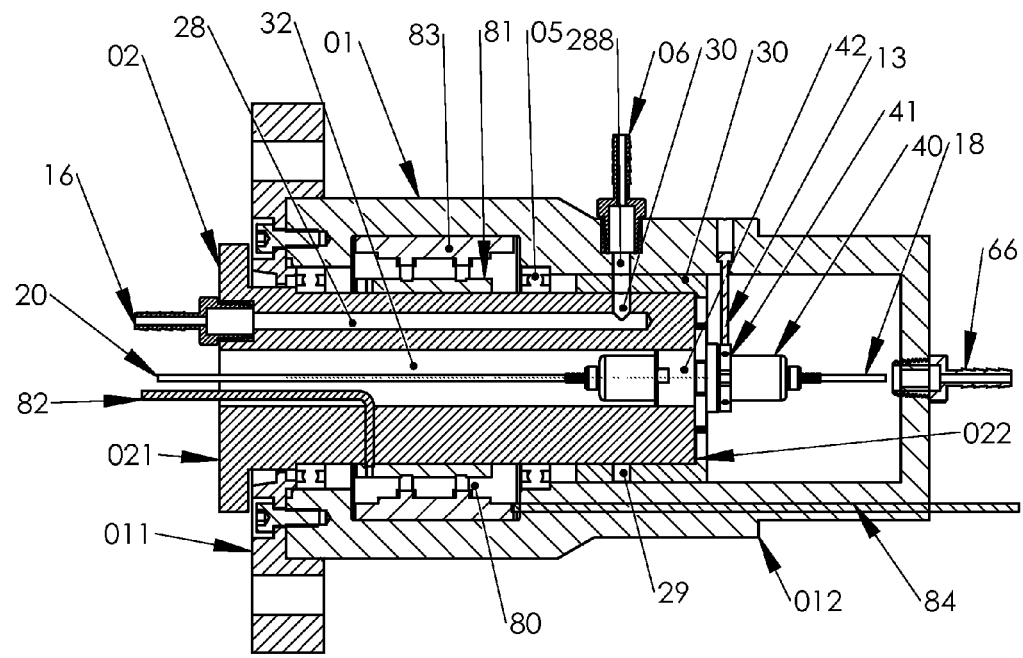
FIG. 2 is the first embodiment of an integrated electro-optical fluid rotary joint in the present invention.
Figure 3:
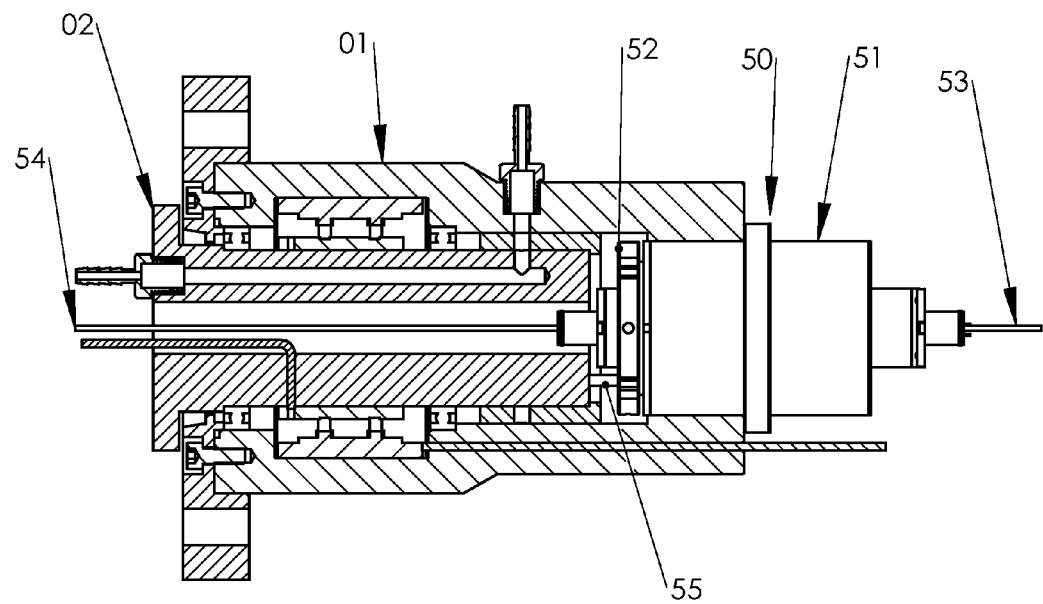
FIG. 3 illustrates second embodiment of an integrated electro-optical fluid rotary joint in the present invention.

A detailed explanation of 2 preferred embodiments in the present invention with reference to FIG. 1, FIG. 2 and FIG. 3 is as follows.

FIG. 1. shows the main configuration of the main stator 01 and main rotor 02 in the present invention. The main rotor 02 is rotatable relative to the main stator 01 through a pair of bearings 05. The main stator is a cylindrical part with an inner space. The main rotor 02 is also a cylindrical part with a central hole 32 and at least one off-centered hole 28. The main stator has two end surfaces: the first end surface 011 and second end surface 012. The main rotor 02 has two end surfaces: the first end surface 021 and second end surface 022. The annular space between the opposing peripheral surfaces of the main stator 01 and the main rotor 02 is divided into three portions along the axial direction: the front portion 111, the rear portion 333 and the middle portion 222. The off-centered hole 28 has first end opening 35 at the first end surface 021 of the main rotor 02, and has second end opening 30 on the peripheral surface of the main rotor 02 towards to the middle portion 222.

In FIG. 2, the first preferred embodiment an integrated electro-optical fluid rotary joint in the present invention comprises a main stator 01, and a main rotor 02. The main configuration of the main stator 01 and main rotor 02 is shown in FIG. 1. At the rear portion 333 of the main configuration as shown in FIG. 1, a fiber optical rotary joint 40 consists of a rotor assembly 41, with a first fiber bundle 18, and a stator assembly 42, with a second fiber bundle 20. When the rotor assembly 41 rotates relatively to stator assembly 42, optical signals can be transmitted between the first fiber bundle 18 and the second fiber bundle 20. The stator assembly 42 of the fiber optical rotary joint 40 is mounted in the central hole of the main rotor 02 from the second end 022 of the main rotor 02. The rotor assembly 41 of the fiber optical rotary joint 40 is secured with the main stator 01 by a pin 13, which is fixed with main stator 01 at one end and physically connected with the rotor assembly 41 of the fiber optical rotary joint 40 on another end, from the second side 012 of the main stator 01. So if the main rotor 02 rotates relative to the main stator 01, the stator assembly 42 of the fiber optical rotary joint 40 also rotates with the main rotor 02, relative to the main stator 01 and the rotor assembly 41 of fiber optical rotary joint 40, transferring optical signals between the first fiber bundle 18 and second fiber bundle 20.

Still refers to FIG. 2, an electrical rotary joint, or slip ring 80 is located at the front portion 111 of the main configuration of FIG. 1. It consists of commuters 83 with first exit cable 84 and conductive rings 81 with second exit cable 82. The conductive rings 81 is mounted on the main rotor 02, insulated from it, and commuters 83 is fixed with the main stator 01 from the inner space of the main stator 01. When the main rotor 02 rotates relative to the main stator 01, the fixed brushes (not shown here) from commuters 83 run in contact with the conductive rings 81, rubbing against the peripheral surfaces of the conductive rings 81, transferring electrical power or signals between the first exit cable 84 and second exit cable 82.

Located at the middle portion 222 of the main configuration of FIG. 1 is a fluid rotary joint as shown in FIG. 2. It consists of the main rotor 02, main stator 01, sealing assembly 30, first exit conduit 06 and second exit conduit 16. The sealing assembly 30 isolates the middle portion 222 of the main configuration of FIG. 1 form other portions hermetically and includes a sealed annular space 29. When the main rotor 02 rotates relative to the main stator 01, there is no relative movement between the sealing assembly 30 and main stator 01. A fluid passage from the off-centered hole 28 on the main rotor 02 continuous via a sealed annular space 29 and running through a fluid passage 288 on the main stator 01.

As a result, when the main rotor 02 rotates relative to the main stator 01, optical signals, electrical power, and/or signal(s), as well as fluids from the first end surface 021 of the main rotor 02 can be transmitted to the second end surface 012 of the main stator 01.

For some application like aerostats, or lighter than air vehicles, the fluid can be any lighter than air gasses, like hydrogen, helium, methane, and ammonia. Especially, for hydrogen, and helium, a leakage is unavoidable due to its small atomic size. In this case, a vacuum suction 66 can be added on the main housing 01 to collect and recycle gases from leakage.

FIG. 3 illustrates second preferred embodiment of an integrated electro-optical fluid rotary joint in the present invention. Comparing with the first preferred embodiment of an integrated electro-optical fluid rotary joint in the present invention, the only difference is the means to attach fiber optical rotary joint to the main stator 01 and main rotor 02. A fiber optical rotary joint 50 consists of a stator assembly 51, with a first fiber bundle 53, and a rotor assembly 52, with a second fiber bundle 54. When the rotor assembly 52 rotates relatively to stator assembly 51, optical signals can be transmitted between the first fiber bundle 53 and the second fiber bundle 54. The stator assembly 51 of the fiber optical rotary joint 50 is mounted in the central hole of the main stator 01 from the second end surface 012 of the main stator 01. The rotor assembly 52 of the fiber optical rotary joint 50 is secured with the main rotor 02 by a drive pin 55, which is fixed with main rotor 02 at one end and physically connected with the rotor assembly 52 of the fiber optical rotary joint 50, from the second side 022 of the main rotor 02. So if the main rotor 02 rotates relative to the main stator 01, the rotor assembly 52 of the fiber optical rotary joint 50 also rotates with the main rotor 02, relative to the main stator 01 and the stator assembly 51 of fiber optical rotary joint 50, transferring optical signals between the first fiber bundle 53 and second fiber bundle 54.

We claim:

1. An integrated electro-optical fluid rotary joint for optical signals, electrical power, and/or signal(s), as well as fluids across a common rotary-stationary interface comprising:
    a main stator with a central hole and an sealed internal space;
    a couple of bearings;
    a main rotor with a central hole, being rotatable relative to said main stator through said bearings;
    an electrical rotary joint, or slip ring, with commuters and conductive rings;
    a fiber optical rotary joint, with a rotor assembly, and a stator assembly;
    a fluid rotary joint, having a sealing assembly with a sealed annular space, and related with said main stator and said main rotor;
    and the annular space between the opposing peripheral surfaces of said main stator and the main rotor being divided into at least three portions along the axial direction: the first portion, the second portion and the third portion;
    said main stator further comprise: the first end surface as well as second end surface, and a fluid passage at said second portion; and
    said the main rotor further comprise: the first end surface related to said first end surface of said main stator, and second end surface related to said second end surface of said main stator.

2. An integrated electro-optical fluid rotary joint according to claim 1, wherein said main rotor further comprises at least one off-centered hole, which has a first end opening at the first end surface of said main rotor, and has second end opening around the second end surface of said main rotor towards to said second portion.

3. An integrated electro-optical fluid rotary joint according to claim 2, wherein said fiber optical rotary joint further comprising:
    a first fiber bundle from said rotor assembly, and a second fiber bundle from said stator assembly; and said stator assembly of said fiber optical rotary joint being mounted in said central hole of said main rotor from said second end surface of said main rotor; further more, said rotor assembly of said fiber optical rotary joint being secured with said main stator by a pin, or any other means, which is fixed with said main stator at one end and physically connected with said rotor assembly of said fiber optical rotary joint on another end, from said second end surface of said main stator; wherein said second fiber bundle exits from said central hole of said main rotor from said first end surface of said main rotor and said first fiber bundle exits from said central hole of said main stator from said second end surface of said main stator.

4. An integrated electro-optical fluid rotary joint according to claim 1, wherein said electrical rotary joint, or slip ring, further comprises:
    a first exit cable from said commuters; a second exit cable from said conductive rings; and
    at said first portion, said conductive rings being mounted on said main rotor, insulated from it, and said commuters being fixed with said main stator from said internal space of said main stator; between the first exit cable and second exit cable; wherein said first cable exits from said central hole of said main rotor and said second cable exits from said central hole of said main stator from said second end surface of said main stator.

5. An integrated electro-optical fluid rotary joint according to claim 2, wherein said fluid rotary joint further comprises:
    a first exit conduit connected with said first end opening of said off-centered hole on said main rotor, and second exit conduit connected with said fluid passage on said main stator; a fluid passage from said off-centered hole on said main rotor continuous via said sealed annular space of said sealing assembly and running through said fluid passage on said main stator.

6. An integrated electro-optical fluid rotary joint according to claim 1, wherein said main stator further comprises a vacuum suction device from said sealed internal space for collecting and recycling fluids from possible leakage.

7. An integrated electro-optical fluid rotary joint for optical signals, electrical power, and/or signal(s), as well as fluids across a common rotary-stationary interface comprising:
    a main stator with a central hole and an sealed internal space;
    a couple of bearings;
    a main rotor with a central hole, being rotatable relative to said main stator through said bearings;
    an electrical rotary joint, or slip ring, with commuters and conductive rings;
    a fiber optical rotary joint, with a rotor assembly, and a stator assembly;
    a fluid rotary joint, having a sealing assembly with a sealed annular space, and related with said main stator and said main rotor;
    and the annular space between the opposing peripheral surfaces of said main stator and the main rotor being divided into at least three portions along the axial direction: the first portion, the second portion and the third portion;

said main stator further having the first end surface as well as second end surface, and a fluid passage at said second portion; and said the main rotor further having the first end surface related to said first end surface of said main stator, and second end surface related to said second end surface of said main stator.

8. An integrated electro-optical fluid rotary joint according to claim 7, wherein said main rotor further having at least one off-centered hole, which has a first end opening at the first end surface of said main rotor, and has second end opening around the second end surface of said main rotor towards to said second portion.

9. An integrated electro-optical fluid rotary joint according to claim 8, wherein said fiber optical rotary joint further has a first fiber bundle from said rotor assembly and a second fiber bundle from said stator assembly; and said stator assembly of said fiber optical rotary joint being mounted in said central hole of said main stator from said second end surface of said main stator; further more, said rotor assembly of said fiber optical rotary joint being secured with said main rotor by a drive pin, which is fixed with said main rotor at one end and physically connected with said rotor assembly of said fiber optical rotary joint on another end, from said second end surface of said main rotor; thus said first fiber bundle exits from said central hole of said main rotor from said first end surface of said main rotor and said second fiber bundle exits from said central hole of said main stator from said second end surface of said main stator.

10. An integrated electro-optical fluid rotary joint according to claim 7, wherein said electrical rotary joint, or slip ring, further comprising:

a first exit cable from said commuters; a second exit cable from said conductive rings; and at said first portion, said conductive rings being mounted on said main rotor, insulated from it, and said commuters being fixed with said main stator from said internal space of said main stator; between the first exit cable and second exit cable; wherein said first cable exits from said central hole of said main rotor and said second cable exits from said central hole of said main stator from said second end surface of said main stator.

11. An integrated electro-optical fluid rotary joint according to claim 8, wherein said fluid rotary joint further comprising:

a first exit conduit connected with said first end opening of said off-centered hole on said main rotor, and second exit conduit connected with said fluid passage on said main stator; a fluid passage from said off-centered hole on said main rotor continuous via said sealed annular space of said sealing assembly and running through said fluid passage on said main stator.

12. An integrated electro-optical fluid rotary joint according to claim 7, wherein said main stator further comprising a vacuum suction device from said sealed internal space for collecting and recycling fluids from possible leakage.

* * * * *